United States Patent
Turlikov et al.

(10) Patent No.: US 9,614,560 B2
(45) Date of Patent: Apr. 4, 2017

(54) RECEIVER WITH IMPROVED NOISE VARIANCE ESTIMATION

(75) Inventors: Andrey Turlikov, Saint-Petersburg (RU); Grigory S. Evseev, Saint-Petersburg (RU); Eugine A. Bakin, Saint-Petersburg (RU)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 13/993,488

(22) PCT Filed: Mar. 30, 2012

(86) PCT No.: PCT/RU2012/000236
§ 371 (c)(1),
(2), (4) Date: Apr. 8, 2014

(87) PCT Pub. No.: WO2013/147634
PCT Pub. Date: Oct. 3, 2013

(65) Prior Publication Data
US 2016/0191088 A1 Jun. 30, 2016

(51) Int. Cl.
*H04L 1/24* (2006.01)
*H04B 1/10* (2006.01)
(Continued)

(52) U.S. Cl.
CPC .......... *H04B 1/109* (2013.01); *H04B 1/1036* (2013.01); *H04B 15/00* (2013.01); *H04B 17/21* (2015.01);
(Continued)

(58) Field of Classification Search
CPC ................. H04L 2025/03611; H04L 25/03885
(Continued)

(56) References Cited

U.S. PATENT DOCUMENTS

| 6,064,655 A | 5/2000 | Murphy |
| 6,700,919 B1 | 3/2004 | Papasakellariou |

(Continued)

FOREIGN PATENT DOCUMENTS

| EP | 0 717 559 A2 | 6/1996 |
| EP | 1 294 150 A2 | 3/2003 |

(Continued)

OTHER PUBLICATIONS

Office Action received for Korean Patent Application No. 10-2013-7025262, mailed on Oct. 29, 2014, 4 Pages of English Translation and 5 pages of Korean Office Action.

(Continued)

*Primary Examiner* — David S Huang
(74) *Attorney, Agent, or Firm* — Grossman, Tucker, Perreault & Pfleger, PLLC

(57) ABSTRACT

A system according to one embodiment includes an automatic gain control circuit configured to provide an amplifier gain value; a temperature sensing circuit configured to provide a temperature; an antenna switching circuit configured to decouple an antenna from the receiver during a noise figure calibration interval; a signal power measurement circuit configured to measure input power to the receiver; a noise figure estimation circuit configured to estimate a receiver noise figure during the noise figure calibration interval based on an initial receiver noise variance, the temperature and the amplifier gain value, wherein the initial receiver noise variance is estimated based on the measured input power during the noise figure calibration interval; and a noise variance tracking circuit configured to calculate updated estimates of the receiver noise variance, wherein the updated estimates are based on updates of the measured temperature and updates of the measured amplifier gain.

32 Claims, 7 Drawing Sheets

(51) Int. Cl.
    *H04B 17/345* (2015.01)
    *H04B 17/21* (2015.01)
    *H04B 15/00* (2006.01)
    *H04L 25/03* (2006.01)

(52) U.S. Cl.
    CPC ..... *H04B 17/345* (2015.01); *H04L 25/03993* (2013.01)

(58) Field of Classification Search
    USPC ........................................ 375/227, 345, 346
    See application file for complete search history.

(56) References Cited

U.S. PATENT DOCUMENTS

| | | | |
|---|---|---|---|
| 8,423,862 | B2 | 4/2013 | Yokomakura et al. |
| 9,210,012 | B2 * | 12/2015 | Pustovalov ....... H04L 25/03159 |
| 2003/0058951 | A1 | 3/2003 | Thomson et al. |
| 2004/0125863 | A1 | 7/2004 | Ghosh |
| 2004/0234009 | A1 * | 11/2004 | Fimoff ................ H04L 25/0212 375/343 |
| 2004/0240587 | A1 * | 12/2004 | Ozen .................... H04L 25/023 375/340 |
| 2005/0271016 | A1 | 12/2005 | Kim et al. |
| 2007/0133672 | A1 | 6/2007 | Lee et al. |
| 2007/0183517 | A1 | 8/2007 | Liu et al. |
| 2009/0245338 | A1 | 10/2009 | Jonsson |
| 2009/0285274 | A1 | 11/2009 | Shiue et al. |
| 2010/0128774 | A1 | 5/2010 | He |
| 2010/0232491 | A1 | 9/2010 | Hayashi |
| 2011/0069742 | A1 | 3/2011 | Narayan et al. |
| 2011/0201269 | A1 | 8/2011 | Hobbs et al. |
| 2012/0099637 | A1 | 4/2012 | Hu et al. |
| 2014/0086299 | A1 | 3/2014 | Pustovalov et al. |
| 2014/0211837 | A1 | 7/2014 | Bakin et al. |
| 2015/0063496 | A1 * | 3/2015 | Vakilian .............. H04L 27/2649 375/340 |

FOREIGN PATENT DOCUMENTS

| | | |
|---|---|---|
| EP | 1 584 168 B1 | 1/2007 |
| GB | 2 449 554 A | 11/2008 |
| JP | 2003-152603 A | 5/2003 |
| JP | 2006-352218 A | 12/2006 |
| JP | 2010-087707 A | 4/2010 |
| WO | 2009/099092 A1 | 8/2009 |
| WO | 2012/134319 A1 | 10/2012 |
| WO | 2013/147634 A1 | 10/2013 |

OTHER PUBLICATIONS

Office Action received for Chinese Patent Application No. 201210103912.2, mailed on Jun. 4, 2014, 12 pages of English Translation and 8 pages of Chinese Office Action.
Banovic, Kevin, "Adaptive Equalization: A Tutorial," Research Centre for Integrated Microsystems—University of Windsor, Oct. 14, 2005, 25 pages, Windsor, Ontario, Canada.
Garg, Ravi, "Adaptive Equalization Techniques using Least Mean Square (LMS) algorithm," Electrical Engineering, Term Paper, Sep. 12, 2009, 11 pages.
Hatae, et al., "Comparing single and multiple carrier schemes using channel coding," 11th International OFDM-Workshop InOWo, Aug. 30-31, 2006, 5 pages.
Liu, et al., "Iterative Frequency-Domain Channel Estimation and Equalization for Single-Carrier Transmissions Without Cyclic-Prefix," vol. 7, No. 10, XP011236893, IEEE Transactions on Wireless Communications, IEEE Service Center, Oct. 2008, 6 pages.
Kim, et al., "Near-Optimum Blind Decision Feedback Equalization for ATSC Digital Television Receivers," ETRI Journal, vol. 26, No. 2, Apr. 2004, pp. 101-111.
Labat, et al., "Adaptive Decision Feedback Equalization: Can You Skip the Training Period," IEEE Transactions on Communications, vol. 46, No. 7, XPOI1009209, IEEE Service Center, Jul. 1998, pp. 921-930.
Mackenzie, "General Description of Laboratory Tests," Multi path Interference, DTV Field Test Report in Brazil, Jul. 2000, 282 pages.
Mendes, et al., "MI-SBTVD: A Proposal for the Brazilian Digital Television System SBTVD," Journal of the Brazilian Computer Society ISSN 0104-6500, J. Braz. Comp. Soc. vol. 12, No. 4 Campinas, Mar. 2007, pp. 57-82.
Pham, et al., "Enhanced ATSC DTV Channel Estimation," IEEE Conference on Electrical and Computer Engineering, May 2009, pp. 772-776.
Sohail, et al., "A Non-Iterative Channel Estimation and Equalization Method for TDS-OFDM Systems," Wireless Communications and Mobile Computing Conference (IWCMC), 7th International, Jul. 4-8, 2011, 5 pages.
Ta-Hong, et al., "Decision Feedback Equalizer," Version 1.4, Connexions module: m15524, Nov. 14, 2007, 2 pages.
Takeda, et al., "Joint Tomlinson-Harashima Precoding and Frequency-Domain Equalization for Broadband Single-Carrier Transmission," IEICE Trans. Communication, vol. E91-B, No. 1, Jan. 2008, pp. 258-266.
Wang, et al., "Design and Implementation of Frequency Domain Equalizer for ATSC System," Broadband Multimedia Systems and Broadcasting, 2008 IEEE International Symposium on IEEE, XP031268564, 2008, 6 pages.
Wenyi, Dai, "Turbo Equalization of Wireless Communication Systems," China Master's Theses Full-text Database, Information Technology Section (Monthly), 2009, No. 12, 3 pages.
Yasmin, et al., "Blind Channel Equalization in Impulse Noise," Issue 3, vol. 5, International Journal of Communications, 2011, pp. 132-140.
Zarzoso, et al., "Blind Channel Equalization with Algebraic Optimal Step Size," EUSIPCO-2005, Sep. 2005, 4 pages.
Zarzoso, et al., "Semi-Blind Constant Modulus Equalization With Optimal Step Size," ICASSP-2005, Mar. 2005, 4 pages.
International Preliminary Report on Patentability and Written Opinion Received for PCT Patent Application No. PCT/RU2011/000201, mailed on Oct. 10, 2013, 11 pages.
International Preliminary Report on Patentability and Written Opinion Received for PCT Patent Application No. PCT/RU2011/001047, mailed on Jul. 10, 2014, 9 pages.
International Search Report and Written Opinion received for PCT Patent Application No. PCT/RU2011/001047, mailed on Sep. 21, 2012, 14 pages.
International Preliminary Report on Patentability and Written Opinion received for PCT Patent Application No. PCT/RU2012/000042, mailed on Aug. 14, 2014, 8 pages.
International Search Report and Written Opinion received for PCT Patent Application No. PCT/RU2012/000042, mailed on Oct. 11, 2012, 13 Pages.
International Preliminary Report on Patentability and Written Opinion received for PCT Patent Application No. PCT/RU2012/000236, mailed on Oct. 9, 2014, 8 pages.
International Preliminary Report on Patentability and Written Opinion Received for PCT Patent Application No. PCT/RU2012/000382, mailed on Nov. 27, 2014, 6 pages.
International Search Report and Written Opinion received for PCT Patent Application No. PCT/RU2012/000382, mailed on Feb. 14, 2013, 8 pages.
International Search Report and Written Opinion received for PCT Application No. PCT/RU2012/000236, mailed on Jan. 25, 2013, 12 pages.
International Search Report and Written Opinion received for PCT Application No. PCT/RU2011/000201, mailed on Jun. 13, 2012, 16 Pages.
Invitation to Pay Add'l Fees and Partial Search Report received for PCT Application No. PCT/RU2011/000201, mailed on Jan. 17, 2012, 5 Pages.
Office Action received for Japanese Patent Application No. 2012-010985 , mailed on Jun. 18, 2013, 4 Pages of Office Action including 2 pages of English Translation.
Wu et al., "Low Complexity Adaptive Turbo Frequency-Domain Channel Estimation for Single-Carrier Multi-User Detection", IEEE Transactions on Wireless Communications, IEEE Service Center, vol. 7, Issue 11, Nov. 1, 2008, Piscataway, NJ, US, pp. 4094-4099.

(56) References Cited

OTHER PUBLICATIONS

Pancaldi et al.,"Single-Carrier Frequency Domain Equalization", IEEE Signal Processing Magazine, IEEE Service Center, vol. 25, Issue 5, Sep. 1, 2008, Piscataway, NJ, US, pp. 37-56.

Benvenuto et al., "Single Carrier Modulation With Nonlinear Frequency Domain Equalization: An Idea Whose Time Has Come Again", Proceedings of the IEEE, vol. 98, Issue 1, Jan. 1, 2010, New York, US, pp. 69-96.

ATSC Digital Television Standards Part 2—RF Transmission System Characteristics, 2007.

Liu et al., "Frequency Domain Turbo Equalization for Vestigial Sideband Modulation with Punctured Trellis Coding", Signal Processing Advances in Wireless Communications, 2006.

ATSC Recommended Practice: Receiver Performance Guidelines (with Corrigendum 1 and Amendment 1).

Zivkovic, et al., "An Improved Preamble-Based SNR Estimation Algorithm for OFDM Systems" IEEE International Symposium on Personal, Indoor and Mobile Radio Communications, 2010.

Yucek, et al., "MMSE Noise Power and SNR Estimation for OFDM Systems", IEEE Sarnoff Conferences, Princeton, NJ, Mar. 2006.

\* cited by examiner

RECEIVER WITH IMPROVED NOISE VARIANCE ESTIMATION

FIELD

The present disclosure relates to receivers, and more particularly, to streaming input digital receivers with improved noise variance estimation.

BACKGROUND

Receivers often employ digital signal processing (DSP) techniques to improve performance. Many of these DSP techniques are based on an assumption that Additive White Gaussian Noise (AWGN) is present in the receiver and these techniques typically require some knowledge or estimate of the noise variance of the AWGN for operation.

Some existing techniques for estimating noise variance in a receiever rely on the insertion of known or pre-determined pseudo-noise (PN) sequences into the communication stream at fixed times so that the receiver can calculate the noise variance of the PN sequence. The insertion of PN sequences in the communication stream, however, uses up bandwidth and is therefore inefficient. This method also fails to work on channels with long impulse response or channels subject to Doppler shift.

In some cases, where the communication stream is under-utilized for example, the receiver may take advantage of pauses between the messages to measure the inherent receiver noise variance. This method, though, has limited applicability since it relies on the existence of frequent pauses.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for estimating the noise variance in a receiver, such as, for example, an Advanced Television System Committee (ATSC) digital TV receiver. This may be accomplished by decoupling the antenna from the receiver at selected times and calibrating (or recalibrating) the receiver using a measurement of the input signal power while the antenna is switched off. This provides an estimate of the inherent receiver noise level, which may then be used, in conjunction with the measured temperature and amplifier gain, to calculate the receiver noise figure. The antenna is then re-coupled to the receiver for normal operation, during which, estimates of the receiver noise variance may be updated at regular intervals based on the previously calculated receiver noise figure and further based on updated measurements of the temperature and amplifier gain during receiver operation. The calibration times may be selected to reduce noticeable effects due to the interruption of the incoming signal.

Figure 1:
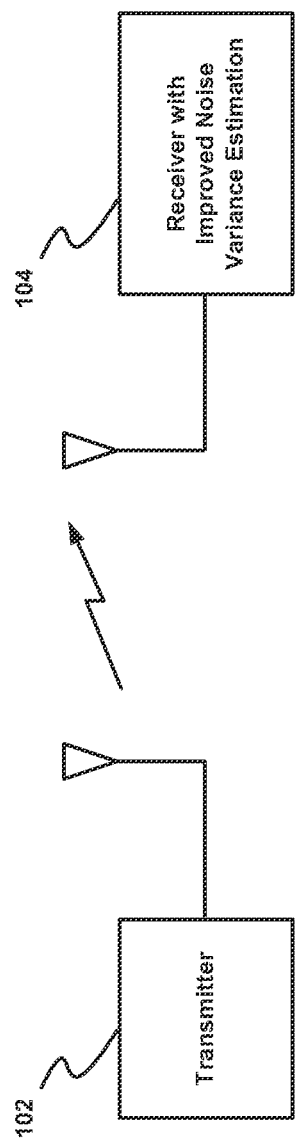
FIG. 1 illustrates a top level system diagram of one exemplary embodiment consistent with the present disclosure.

FIG. 1 illustrates a top-level system diagram 100 of one exemplary embodiment consistent with the present disclosure. Transmitter 102 transmits a signal, which is received by receiver 104. In some embodiments, transmitter 102 may transmit an ATSC digital television signal and receiver 104 may be configured to receive such a signal. Receiver 104 implements an improved noise variance estimation system. Receiver 104 may employ DSP techniques to improve performance, such as, for example, a Minimum Mean Square Error (MMSE) channel equalizer. Many of these DSP techniques rely on knowledge of the receiver noise characteristics, such as the power spectral density of the noise. The receiver noise may typically be modeled as Additive White Gaussian Noise (AWGN), which has a uniform power spectrum and a Gaussian probability density function which allows it to be completely specified by a single parameter, the noise variance.

Figure 2:
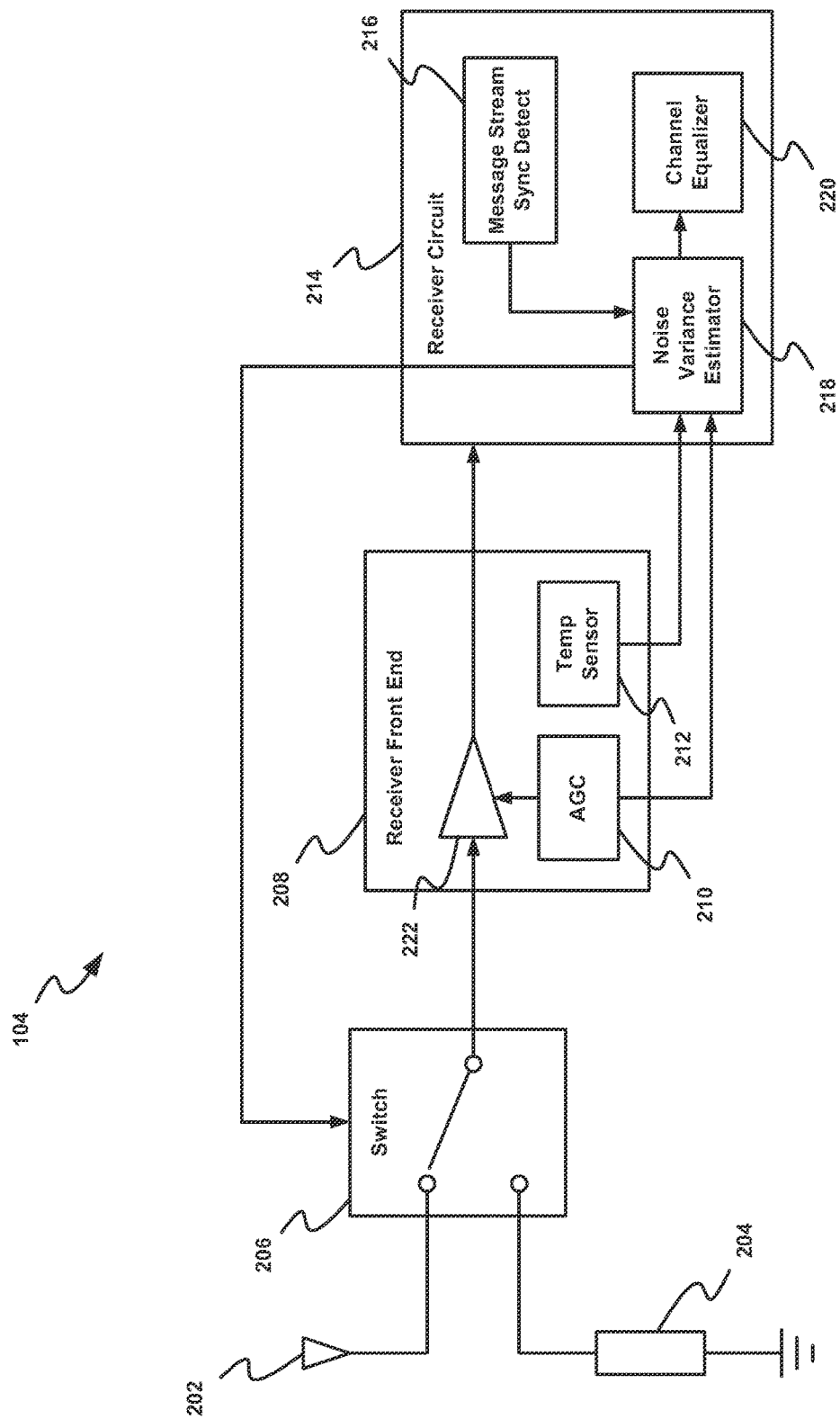
FIG. 2 illustrates a system block diagram of one exemplary embodiment consistent pith the present disclosure.

FIG. 2 illustrates a system block diagram 200 of one exemplary embodiment consistent with the present disclosure. Receiver 104 is shown to include antenna 202, antenna switch 206, receiver front end 208 and digital receiver circuit 214. Antenna switch 206 is configured to couple or decouple antenna 202 from receiver front end 208 under control of receiver circuit 214 as will be described in greater detail below. When antenna 202 is decoupled from the receiver front end 208, an antenna equivalent load or antenna equivalent circuit 204 is switched in to replace the antenna. The antenna equivalent load 204 is configured to provide emulated antenna noise.

The receiver front end 208 couples the received input signal, for example from the antenna 202 or antenna equivalent load 204, to the receiver circuit 214 through an amplifier 222. In some embodiments, the amplifier 222 may be a low noise amplifier. The amplifier gain may be controlled by automatic gain control (AGC) circuit 210, which may adjust the amplifier gain $K_{amp}$, based on the channel to which the receiver is tuned, signal reception conditions or any other suitable basis. Receiver front end 208 may also comprise a temperature sensor 212 configured to measure the temperature of the receiver front end 208. As will be explained below, receiver noise may depend on both amplifier gain and temperature.

Receiver circuit 214 is shown to comprise a noise variance estimator circuit 218, a channel equalizer circuit 220 and a message stream synchronization frame detector 216. Receiver circuit 214 may also include other components associated with signal reception and processing which are not shown for simplicity. Noise variance estimator circuit 218 estimates the AWGN noise variance of the receiver 104, as will be explained below, based, in part, on the current amplifier gain setting, $K_{amp}$, provided by AGC circuit 210, and the current temperature measurement provided by temperature sensor 212. Noise variance estimator circuit 218 also controls switch 206 to toggle between an operational mode and a calibration mode by substituting an antenna equivalent load for an antenna during calibration mode. In some embodiments, the timing of these modes may be based upon the detection of message stream synchronization frames in the received input signal by message stream synchronization frame detector 216. The estimated noise variance may be provided to channel equalizer circuit 220 or any other signal processing elements in the receiver that may utilize this information.

Figure 3:
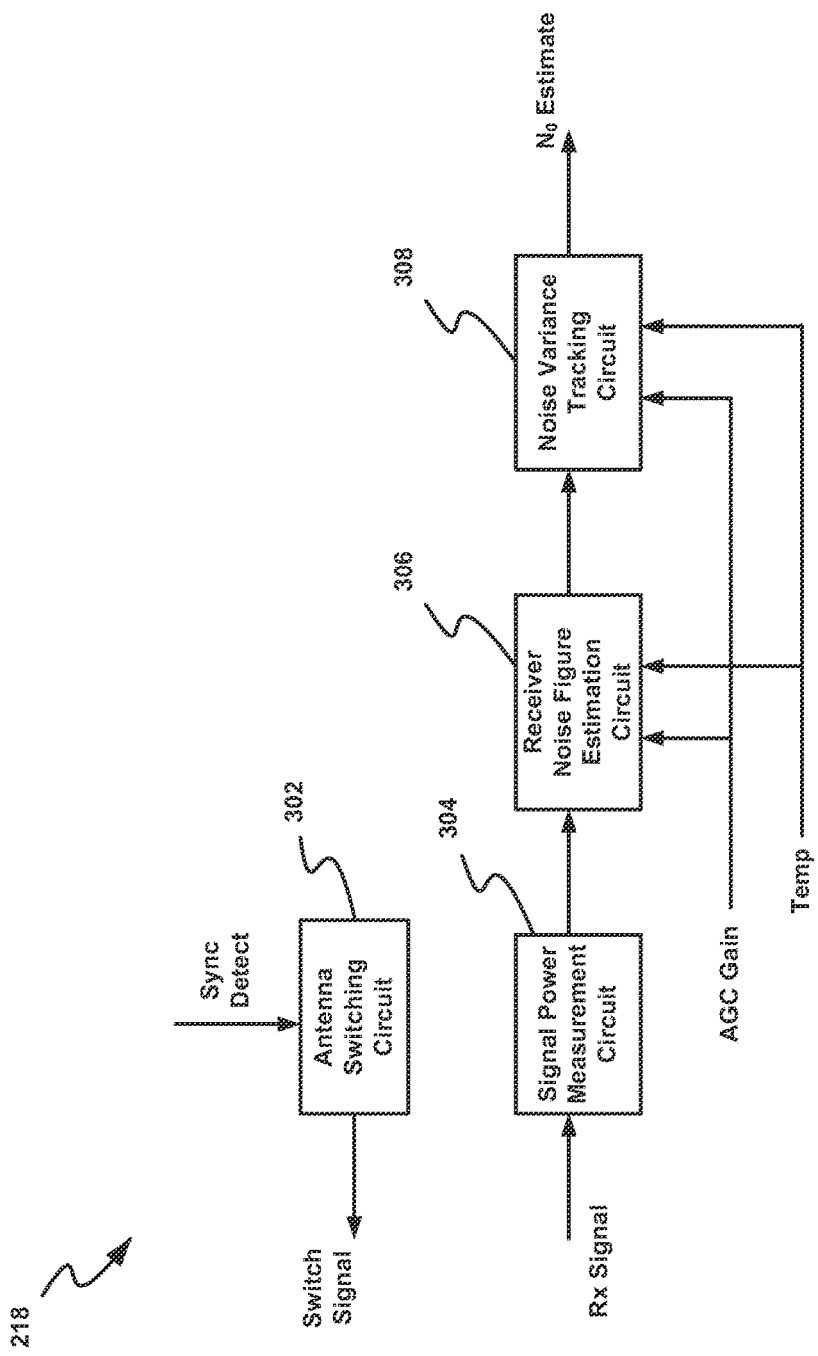
FIG. 3 illustrates a more detailed block diagram of one exemplary embodiment consistent with the present disclosure.

FIG. 3 illustrates a block diagram 300 of one exemplary embodiment consistent with the present disclosure showing noise variance estimator circuit 218 in greater detail. During calibration periods, the antenna switching circuit 302 causes switch 206 to decouple antenna 202 from the receiver front end 208. The received input signal is provided to signal power measurement circuit 304, which, during calibration periods, represents receiver noise since the antenna equivalent load 204 has been substituted for the antenna 202. Receiver noise figure estimation circuit 306 calculates an initial estimate of the receiver noise variance, $N_0(\text{Initial})$, based on the signal power measurement which is representative of the receiver noise variance during the calibration interval. Receiver noise figure estimation circuit 306 then calculates a receiver noise figure estimate, $K_n$, based on $N_0(\text{Initial})$ along with the current a amplifier gain setting, $K_{amp}$, provided by AGC circuit 210, and the current temperature measurement, T, provided by temperature sensor 212. The receiver noise figure may be calculated according to the equation:

$$K_n = \frac{N_0(\text{Initial})}{kT \cdot K_{amp}},$$

where k is Boltzmann's constant.

The estimated receiver noise figure, from each calibration period, is provided to the noise variance tracking circuit 308 which updates the receiver noise variance estimate during normal operation of the receiver, i.e., non-calibration intervals or periods when the antenna 202 is re-coupled to the receiver front end 208. Noise variance tracking circuit 308 updates the receiver noise variance estimate, $N_0$, based on the most recent receiver noise figure, $K_n$, as well as the most recently updated AGC gain, $K_{amp}$, and temperature measurement, T, according to the equation:

$$N_0 = kT \cdot K_{amp} \cdot K_n.$$

The receiver noise variance estimate, $N_0$, may then be used by the channel equalization circuit 220.

Figure 4:
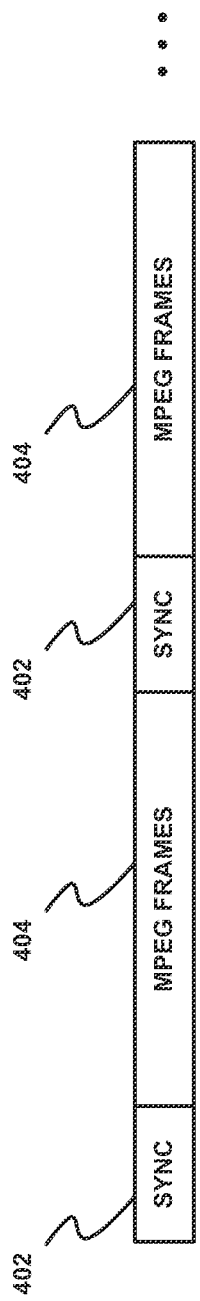
FIG. 4 illustrates a message frame structure consistent with one exemplary embodiment of the present disclosure.

FIG. 4 illustrates a message frame structure 400 consistent with one exemplary embodiment of the present disclosure. In some embodiments, the received signal may be a video signal, such as, for example, a Motion Picture Experts Group (MPEG) signal. These types of video signals may comprise synchronization (sync) frames 402 and data frames 404. Since the calibration process, described above, involves the temporary decoupling of the antenna 202 and resulting loss of input signal, a miss-timing of the MPEG data stream may occur which can result in loss of the video image for up to one second, for example, where sync frames occur at one second intervals. An image loss of this duration would be highly noticeable to a viewer and thus undesirable. By timing the calibration periods to occur just prior to a sync frame, however, a recovery from any miss-timing could be achieved relatively quickly at the next sync frame before any noticeable degradation of the video image results. Message stream synchronization frame detector 216, may therefore be used to detect sync frames in the video stream and time the calibration periods to occur at a pre-defined offset in time prior to the sync frame.

In some embodiments, calibration periods may also be timed to coincide with power-up of the receiver and/or with occurrences of channel switching since these events provide opportunities where video image degradation would be less noticeable.

Figure 5:
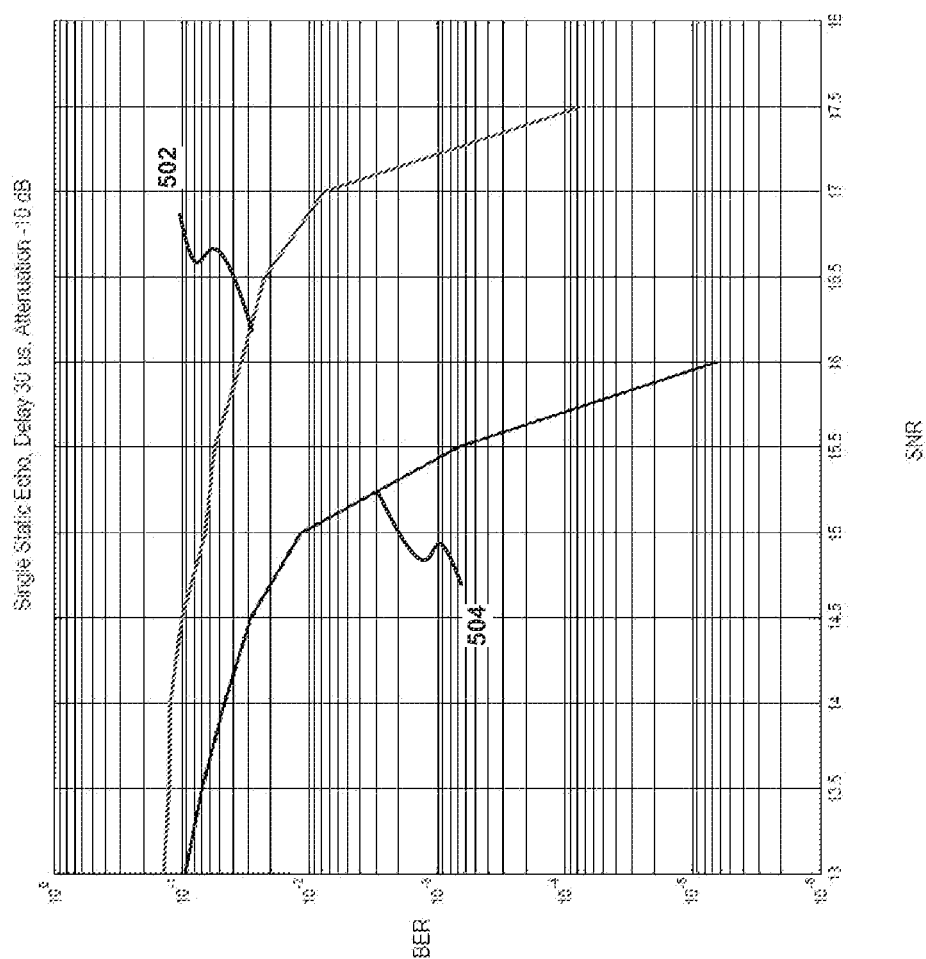
FIG. 5 illustrates bit error rate curves consistent with one exemplary embodiment of the present disclosure.

FIG. 5 illustrates bit error rate (BER) curves 500 consistent with one exemplary embodiment of the present disclosure. To generate these BER curves, receiver performance was simulated on an input signal containing a single echo, with a 30 us delay and 10 dB attenuation, over a range of signal to noise ratios (SNRs) from 13 dB to 18 dB. The performance of the receiver (as measured by the BER) depends on the performance of the channel equalizer which, in turn, depends on the quality of the noise variance estimate. Curve 502 was generated based on a traditional digital PN variance estimate, while curve 504 was generated from a noise variance estimate in accordance with an embodiment of the present disclosure. Curve 504 represents an upper bound on the receiver performance and, as can be seen, the BER is lower for curve 504 compared to curve 502, representing a performance improvement over the entire SNR range.

Figure 6:
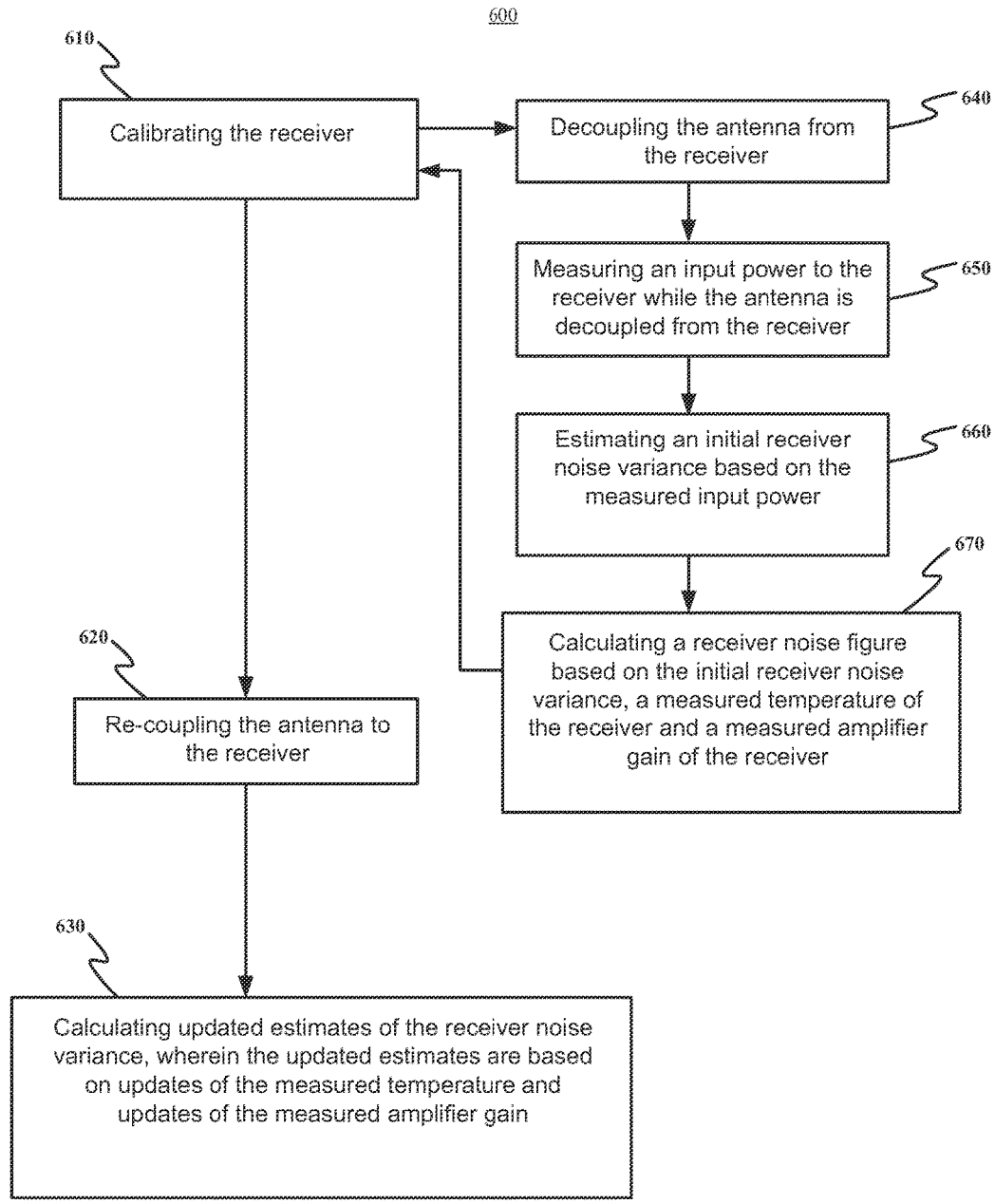
FIG. 6 illustrates a flowchart of operations of an exemplary embodiment consistent with the present disclosure.

FIG. 6 illustrates a flowchart of operations 600 of an exemplary embodiment consistent with the present disclosure. At operation 610, the receiver is calibrated as described in operations 640 through 670. At operation 640, the antenna is decoupled from the receiver. An antenna equivalent load may be substituted in place of the decoupled antenna. At operation 650, an input power to the receiver is measured while the antenna is decoupled from the receiver. At operation 660, an initial receiver noise variance is estimated based on the measured input power. At operation 670, a receiver noise figure is calculated based on the initial receiver noise variance, a measured temperature of the receiver and a measured amplifier gain of the receiver.

At operation 620, the antenna is re-coupled to the receiver. At operation 630, updated estimates of the receiver noise variance are calculated based on updates of the measured temperature and updates of the measured amplifier gain.

Figure 7:
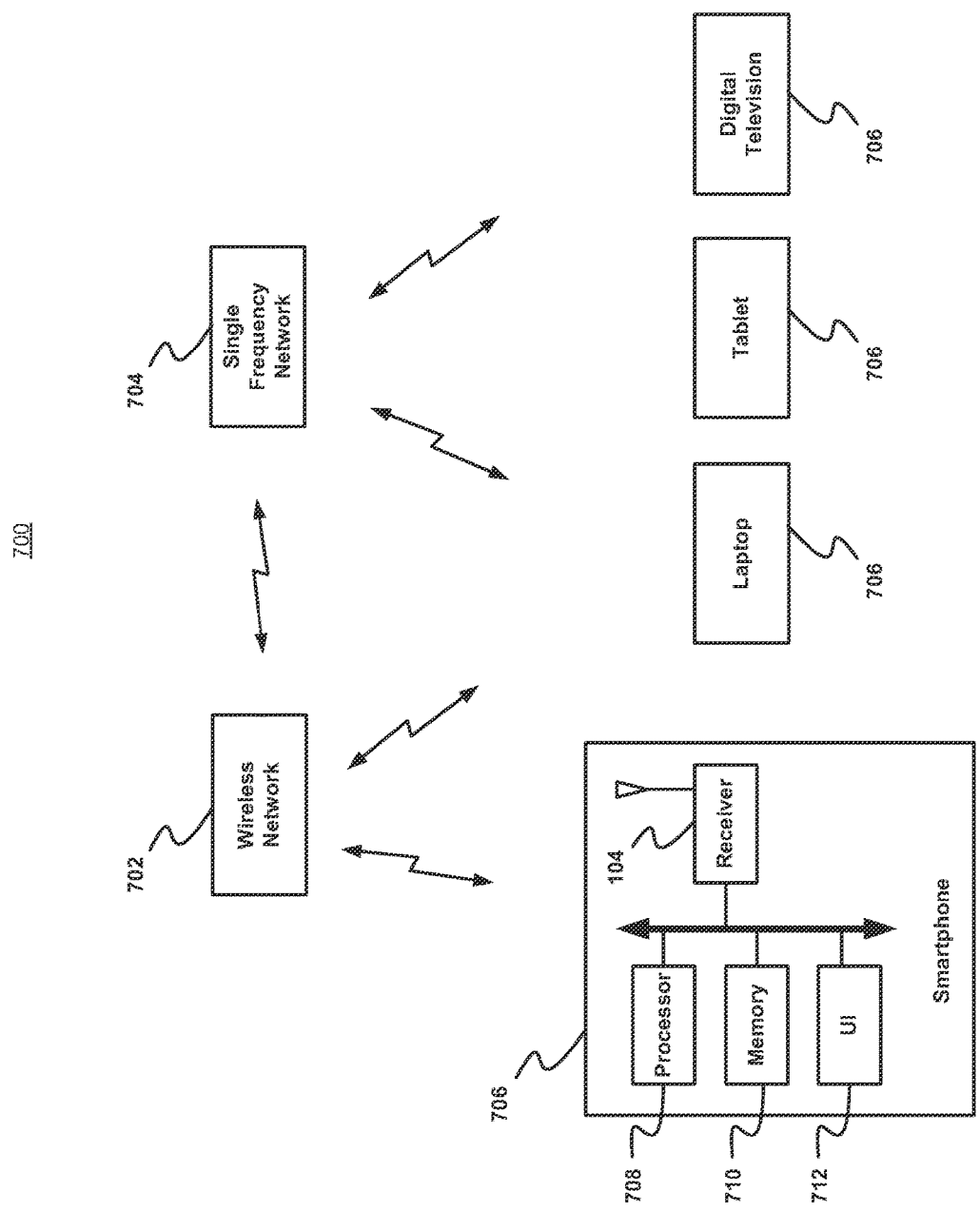
FIG. 7 illustrates a system diagram of another exemplary embodiment consistent with the present disclosure.

FIG. 7 illustrates a system diagram 700 of another exemplary embodiment consistent with the present disclosure. A mobile communication device 706 is shown, which may be a smartphone, a laptop computing device, a tablet, a digital television or any other suitable type of mobile or portable device configured to receive a signal. The mobile communication device 706 may receive signals over a wireless network 702, a single frequency network 704 or any other suitable type of network. Mobile communication device 706 may comprise a processor 708, a memory 710, a user interface 712 and one or more receivers 104 with improved noise variance estimation. In some embodiments, the user interface may be a touchscreen.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for estimating receiver noise variance, said system comprising:
    an automatic gain control circuit configured to provide an amplifier gain value;
    a temperature sensing circuit configured to provide a temperature;
    an antenna switching circuit configured to decouple an antenna from said receiver during a noise figure calibration interval;
    a signal power measurement circuit configured to measure input power to said receiver;
    a noise figure estimation circuit configured to estimate a receiver noise figure during said noise figure calibration interval based on an initial receiver noise variance, the temperature and the amplifier gain value, wherein the initial receiver noise variance is estimated based on said measured input power during said noise figure calibration interval; and
    a noise variance tracking circuit configured to receive the receiver noise figure and to calculate updated estimates of said receiver noise variance, wherein said updated estimates are based on the receiver noise figure, updates of said measured temperature and updates of said measured amplifier gain.

2. The system of claim 1, wherein said receiver noise figure, $K_n$, is estimated according to:

$$K_n = \frac{N_0(\text{Initial})}{kT \cdot K_{amp}},$$

wherein $N_0(\text{Initial})$ is said estimated initial receiver noise variance, T is said temperature and $K_{amp}$ is said amplifier gain value; and said updated estimates of said receiver noise variance, $N_0$, is calculated according to: $N_0 = kT \cdot K_{amp} \cdot K_n$.

3. The system of claim 1, further comprising an antenna equivalent load, wherein said antenna switching circuit substitutes said antenna equivalent load for said decoupled antenna during said noise figure calibration interval.

4. The system of claim 1, wherein said receiver is a digital ATSC receiver.

5. The system of claim 1, wherein said receiver noise figure is estimated at power-up of said receiver.

6. The system of claim 1, wherein said receiver noise figure is estimated when said receiver switches channels.

7. The system of claim 1, further comprising an MPEG Synchronization Frame detector and wherein said receiver noise figure is estimated within a pre-determined time interval prior to an MPEG Synchronization Frame.

8. The system of claim 1, further comprising a channel equalizer circuit configured to accept said updated estimates of said receiver noise variance.

9. A method for estimating receiver noise variance, said method comprising:
    calibrating said receiver, said calibrating comprising:
        decoupling an antenna from said receiver;
        measuring an input power to said receiver while said antenna is decoupled from said receiver;
        estimating an initial receiver noise variance, based on said measured input power; and
        calculating, with a noise figure estimation circuit, a receiver noise figure based on said initial receiver noise variance, a measured temperature of said receiver and a measured amplifier gain of said receiver;
    recoupling said antenna to said receiver; and
    with a noise variance tracking circuit, receiving the receiver noise figure and calculating updated estimates of said receiver noise variance, wherein said updated estimates are based on said receiver noise figure, updates of said measured temperature, and updates of said measured amplifier gain.

10. The method of claim 9, wherein said receiver noise figure, $K_n$, is estimated according to:

$$K_n = \frac{N_0(\text{Initial})}{kT \cdot K_{amp}},$$

wherein $N_0(\text{Initial})$ is said estimated initial receiver noise variance, T is said temperature and $K_{amp}$ is said amplifier gain value; and said updated estimates of said receiver noise variance, $N_0$, is calculated according to: $N_0 = kT \cdot K_{amp} \cdot K_n$.

11. The method of claim 9, further comprising substituting an antenna equivalent load for said decoupled antenna.

12. The method of claim 9, wherein said calibration is performed at power-up of said receiver.

13. The method of claim 9, wherein said calibration is performed when said receiver switches channels.

14. The method of claim 9, wherein an input signal to said receiver comprises an MPEG stream and said calibration is performed within a pre-determined time interval prior to an MPEG Synchronization Frame within said MPEG stream.

15. The method of claim 9, wherein said receiver comprises a front-end circuit and said temperature is measured at said front-end circuit.

16. The method of claim 9, wherein said amplifier gain measurement comprises a reporting of said amplifier gain by an automatic gain control circuit in a front-end circuit of said receiver.

17. The method of claim 9, further comprising providing said updated estimates of said receiver noise variance to a channel equalizer circuit.

18. The method of claim 9, wherein said receiver noise is Additive White Gaussian Noise.

19. A non-transitory computer-readable storage medium having instructions stored thereon which when executed by a processor result in the following operations for estimating receiver noise variance, said operations comprising:
calibrating said receiver, said calibrating comprising:
decoupling an antenna from said receiver;
measuring an input power to said receiver while said antenna is decoupled from said receiver;
estimating an initial receiver noise variance, based on said measured input power; and
calculating, with a noise figure estimation circuit, a receiver noise figure based on said initial receiver noise variance, a measured temperature of said receiver and a measured amplifier gain of said receiver;
recoupling said antenna to said receiver; and
with a noise variance tracking circuit, receiving the receiver noise figure and calculating updated estimates of said receiver noise variance, wherein said updated estimates are based on updates of said measured temperature and updates of said measured amplifier gain.

20. The non-transitory computer-readable storage medium of claim 19, wherein said receiver noise figure, $K_n$, is estimated according to:

$$K_n = \frac{N_0(\text{Initial})}{kT \cdot K_{amp}},$$

wherein $N_0(\text{Initial})$ is said estimated initial receiver noise variance, T is said temperature and $K_{amp}$ is said amplifier gain value; and said updated estimates of said receiver noise variance, $N_0$, is calculated according to:
$N_0 = kT \cdot K_{amp} \cdot K_n$.

21. The non-transitory computer-readable storage medium of claim 19, wherein said operations further comprise substituting an antenna equivalent load for said decoupled antenna.

22. The non-transitory computer-readable storage medium of claim 19, wherein said operations further comprise performing said calibration at power-up of said receiver.

23. The non-transitory computer-readable storage medium of claim 19, wherein said operations further comprise performing said calibration when said receiver switches channels.

24. The non-transitory computer-readable storage medium of claim 19, wherein an input signal to said receiver comprises an MPEG stream and said calibration is performed within a pre-determined time interval prior to an MPEG Synchronization Frame within said MPEG stream.

25. A mobile communication device, said device comprising:
a processor;
a memory coupled to said processor;
a user interface coupled to said processor; and
a receiver coupled to said processor, said receiver configured to estimate receiver noise variance wherein said receiver further comprises:
an automatic gain control circuit configured to provide an amplifier gain value;
a temperature sensing circuit configured to provide a temperature;
an antenna switching circuit configured to decouple an antenna from said receiver during a noise figure calibration interval;
a signal power measurement circuit configured to measure input power to said receiver;
a noise figure estimation circuit configured to estimate a receiver noise figure during said noise figure calibration interval based on an initial receiver noise variance, the temperature and the amplifier gain value, wherein the initial receiver noise variance is estimated based on said measured input power during said noise figure calibration interval; and
a noise variance tracking circuit configured to receive the receiver noise figure and to calculate updated estimates of said receiver noise variance, wherein said updated estimates are based on the receiver noise figure, updates of said measured temperature, and updates of said measured amplifier gain.

26. The mobile communication device of claim 25, wherein said receiver further comprises an antenna equivalent load, wherein said antenna switching circuit substitutes said antenna equivalent load for said decoupled antenna during said noise figure calibration interval.

27. The mobile communication device of claim 25, wherein said receiver is a digital ATSC receiver.

28. The mobile communication device of claim 25, further comprising an MPEG Synchronization Frame detector and wherein said receiver noise figure is estimated within a pre-determined time interval prior to an MPEG Synchronization Frame.

29. The mobile communication device of claim 25, further comprising a channel equalizer circuit configured to accept said updated estimates of said receiver noise variance.

30. The mobile communication device of claim 25, wherein said device is selected from the group consisting of a smartphone, a laptop computing device, a tablet, and a digital television.

31. The mobile communication device of claim 25, wherein said user interface is a touchscreen.

32. The mobile communication device of claim 25, wherein said device is configured to communicate over a network, and wherein said network is selected from the group consisting of a wireless network, a single frequency network and a digital television network.

* * * * *